Patented May 18, 1937

2,080,517

UNITED STATES PATENT OFFICE 2,080,517

MEDICINAL PREPARATIONS INCLUDING AMINOPYRIDINE SALTS AND METHODS OF PREPARING AND UTILIZING THE SAME

Edmond T. Tisza, Yonkers, N. Y., assignor to The Pyridium Corporation, Nepera Park, N. Y., a corporation of New York No Drawing. Application November 5, 1931, Serial No. 573,299

3 Claims. (Cl. 260—42)

My invention relates to medicinal substances prepared from 2.6 diamino pyridine and methods of obtaining same, such substances being capable of use in tablet and solution form for therapeutic purposes.

The principal object of the present invention is to make salts of organic acids with 2-6-diaminopyridine which can be used in tablet form to be administered by mouth as an internal antiseptic, and which can also be used in solutions for local application.

While 2-6-diaminopyridine has valuable therapeutic properties, it can not be used as a therapeutic agent on account of its high toxicity. On the other hand 2-6-diaminopyridine has no bacteriostatic action. I have found that this toxicity can be considerably reduced, and a bacteriostatic action may be obtained by increasing the molecular weight of 2-6-diaminopyridine with organic acids. For example, the salicylate of 2-6-diaminopyridine is especially adapted for therapeutic use, and shows a decided bacteriostatic action in vitro against staphylococcus aureus and bacterium coli.

Methods of obtaining organic salts of 2-6-diaminopyridine are described in the following examples:

Example I 6 grams acetic acid and 10.9 grams 2-6-diaminopyridine were dissolved in 30 cc. water. The solution was boiled up and evaporated to small volume. The acetate of 2-6-diaminopyridine crystallizes out on cooling. It was collected on a filter, washed, dried and recrystallized out of methanol. It forms almost colorless prisms with a melting point of 116–117° C.

It is very soluble in water, methanol, and acetone, slightly soluble in ether, carbontetrachloride and benzene. On addition of concentrated sodium hydroxide solution (40%) to a concentrated aqueous solution of the salt, 2-6-diaminopyridine is precipitated in characteristic crystal form.

Example II 12 grams benzoic acid was dissolved in 150 cc. boiling water and a solution of 10 grams 2-6-diaminopyridine in 50 cc. boiling water was added. The solution was boiled up for a few minutes and evaporated to a small volume. The benzoate of 2-6-diaminopyridine crystallizes out on cooling. It was collected on a filter, washed, dried and recrystallized out of methanol. It forms almost colorless prisms, with a melting point of 148° C.

It is very soluble in water, methanol, and acetone, slightly soluble in either, carbontetrachloride, and benzene. On addition of concentrated hydrochloric acid to its aqueous solution, benzoic acid precipitates, and on addition of concentrated sodium hydroxide (40%) to the aqueous solution 2-6-diaminopyridine precipitates.

Example III 13.8 grams salicylic acid and 11.0 grams 2-6-diaminopyridine was dissolved in 100 cc. water on boiling and filtered hot. On cooling 2-6-diaminopyridine salicylate crystallizes out in large crystals. The crystals were collected on a suction filter, washed with cold water, dried and recrystallized out of methanol. It forms almost colorless short thick prisms, with a melting point of 161–163° C.

It is very soluble in water, methanol, and acetone, slightly soluble in ether, carbon tetrachloride and benzene. On addition of concentrated hydrochloric acid to its aqueous solution salicylic acid precipitates, and on addition of concentrated sodium hydroxide (40%) to the aqueous solution 2-6-diaminopyridine precipitates.

The three organic salts of 2-6-diaminopyridine above described have very similar characteristics, and as already mentioned, they are comparatively less toxic, than 2-6-diaminopyridine itself and show a decided bacteriostatic action in vitro against staphylococcus aureus and bacterium coli.

Instead of the organic acids given in the examples above, other organic acids such as propionic, lactic, picric acid, or substituted organic acids such as trichloracetic, chlorobenzoic, amino salicylic acids etc. may be used in making organic salts of 2-6-diaminopyridine for the purpose of reducing its toxicity and obtaining bacteriostatic or even bactericidal action. Therefore I do not intend to limit myself to the above described three organic salts only.

What is claimed as new is:

1. A medicinal preparation adapted to be utilized in tablet form to be administered by mouth as an internal antiseptic and to be used in solutions for local application, of low toxicity, and of high therapeutic and bacteriostatic properties, said preparation consisting of a 2.6 diaminopyridine salt of an aliphatic acid.

2. A preparation suitable for therapeutic use consisting of a 2-6 diaminopyridine salt of an acetic acid soluble in water, methanol and acetone, slightly soluble in ether, carbontetrachloride, and benzene, precipitable by alkali metal hydroxide, from an aqueous solution, in the form of its base.

3. A preparation capable of rendering innocuous, various forms of microbes, particularly those of the cocci group, prepared for this purpose in divided condition and segregated quantities of suitable dosage, said preparation consisting of a 2-6 diaminopyridine salt of an alkyl carboxylic acid.

EDMOND T. TISZA.